(12) United States Patent
Carlson et al.

(10) Patent No.: US 11,343,966 B2
(45) Date of Patent: May 31, 2022

(54) FRAME DESIGN FOR A COTTON PICKING UNIT AND METHOD OF USE

(71) Applicant: DEERE & COMPANY, Moline, IL (US)

(72) Inventors: Brandon C. Carlson, Ankeny, IA (US); Charles F. Ostermeier, Slater, IA (US); Yogesh Kasat, Pune (IN); Prashant Bodade, Pune (IN)

(73) Assignee: DEERE & COMPANY, Moline, IL (US)

( * ) Notice: Subject to any disclaimer, the term of this patent is extended or adjusted under 35 U.S.C. 154(b) by 281 days.

(21) Appl. No.: 16/587,503

(22) Filed: Sep. 30, 2019

(65) Prior Publication Data

US 2021/0092901 A1 Apr. 1, 2021

(51) Int. Cl.
*A01D 46/16* (2006.01)

(52) U.S. Cl.
CPC ..................... *A01D 46/16* (2013.01)

(58) Field of Classification Search
CPC ........ A01D 46/16; A01D 46/18; A01D 46/12; A01D 46/14; A01D 46/08; A01D 46/085
See application file for complete search history.

(56) References Cited

U.S. PATENT DOCUMENTS

| | | | | |
|---|---|---|---|---|
| 1,387,176 A | * | 8/1921 | Price | A01D 46/14 56/47 |
| 1,810,411 A | * | 6/1931 | Berry | A01D 46/16 56/47 |
| 1,946,542 A | * | 2/1934 | Neighbour | A01D 46/08 56/12.3 |
| 2,140,631 A | * | 12/1938 | Johnston | A01D 46/14 56/43 |
| 2,803,938 A | * | 8/1957 | Freda | A01D 46/08 56/41 |
| 2,821,832 A | * | 2/1958 | Morkoski | A01D 46/14 56/44 |
| 4,249,365 A | * | 2/1981 | Hubbard | A01D 46/08 56/13.2 |
| 4,282,702 A | | 8/1981 | McBee | |
| 4,914,897 A | | 4/1990 | Orsborn | |
| 4,922,695 A | | 5/1990 | Covington et al. | |
| 5,038,552 A | | 8/1991 | Thedford et al. | |
| 5,105,609 A | | 4/1992 | Covington et al. | |

\* cited by examiner

*Primary Examiner* — Alicia Torres
*Assistant Examiner* — Madeline I Runco
(74) *Attorney, Agent, or Firm* — Taft Stettinius & Hollister LLP; Stephen F. Rost

(57) ABSTRACT

A row unit for an agricultural machine includes a frame, a floor, and a subassembly discrete from the frame and the floor. The subassembly is configured to be coupled to the floor and the frame and positioned within the frame during operation of the row unit. The subassembly includes a cam-plate including a top side, a bottom side, and a cam-track defined in the bottom side. The subassembly also includes a drum; a plurality of picker-bars coupled to the drum, and a linkage assembly including a first end coupled to the picker-bar and a second end coupled to a roller positioned in the cam-track. The subassembly is assembled prior to being positioned in the frame.

19 Claims, 6 Drawing Sheets

FRAME DESIGN FOR A COTTON PICKING UNIT AND METHOD OF USE

FIELD OF THE DISCLOSURE

The present disclosure relates to a cotton harvester row unit, and in particular, to a subassembly design for a cotton harvester row unit.

BACKGROUND OF THE DISCLOSURE

Cotton harvesters with row units include a number of picking units for harvesting cotton. Each picking unit includes at least one drum, and on some units there may be a front drum and a rear drum. In any event, on each drum there is a number of picker bars and on each picker bar there are a plurality of spindles. Each spindle can be tapered and have a barbed surface for removing the cotton from the cotton plant. Each row unit includes a doffer having a plurality of doffer discs for removing picked cotton from the spindles. A doffer disc may be coated in rubber or urethane and rotatably driven to interact with the spindle. The drum, picker bars, spindles, doffer column, and doffer, among other components rest in a frame of the row unit.

In a conventional cotton picker row unit, the picker bars are attached to the drum after the drum is secured within in the frame. This creates challenges with alignment of several components of the row unit including, often times, the drum or the doffer. Shimming must occur to achieve proper alignment. Additionally, only certain portions of the drum are accessible when the drum is positioned in the frame; therefore, the drum must be rotated to attach each picker bar to the drum. The alignment and attachment processes require considerable time and effort.

SUMMARY

In an illustrative embodiment a row unit for an agricultural machine includes a frame; and a subassembly discrete from the frame and configured to be positioned within the frame during operation of the row unit, the subassembly including: a cam-plate including a top side, a bottom side, and an endless groove defined in the bottom side, a drum; a picker-bar coupled to the drum, and a linkage assembly including a first end coupled to the picker-bar and a second end positioned in the endless groove.

In some embodiments, the cam-plate includes an outer aperture extending through the top side and the bottom side of the cam-plate, the row unit further comprises a doffer extending through the outer aperture of the cam-plate, and the doffer is discrete from the frame. The cam-plate includes a central aperture spaced apart from the outer aperture and extending through the top side and the bottom side of the cam-plate, and the drum extends through the central aperture.

In some embodiments, the subassembly includes an alignment system including: a first marker positioned on the cam-plate, and a second marker positioned on the drum. The second marker is configured to align with the first marker as the drum is rotated relative to the cam-plate.

In some embodiments, the row unit further includes a floor removably coupled to the frame; and a drum mount coupled to the drum and the floor. When the drum mount is fixed relative to the drum, the drum mount is movable relative to the floor between (i) a first position in which the first marker is offset from the second marker and (ii) a second position in which the first marker is aligned with the second marker. In some embodiments, the first marker is a laser; and when the drum mount is engaged with the drum and in the second position, the second marker is configured to pass through a beam of the laser as the drum is rotated relative to the cam-plate.

In some embodiments, the drum includes: an upper cylinder extending through a central aperture of the cam-plate, the upper cylinder having a first longitudinal axis, and a lower cylinder coupled to the upper cylinder and having a second longitudinal axis; and the first longitudinal axis is aligned with the second longitudinal axis when the first marker is aligned with the second marker.

In some embodiments, a central aperture extends through the top side and the bottom side of the cam-plate; and an upper bearing is positioned in the central aperture. The drum includes an upper cylinder, and an upper bearing surrounding the upper cylinder and positioned between the upper cylinder of the drum and the cam-plate to facilitate rotation of the upper cylinder relative to the cam-plate. In drum includes a lower cylinder coupled to the upper cylinder; a floor removably coupled to the frame; a drum mount removably coupled to the floor; and a lower bearing positioned between the drum mount and the lower cylinder of the drum to facilitate rotation of the lower cylinder relative to the cam-plate.

In another illustrative embodiment, a row unit for an agricultural machine includes a subassembly including: a cam-plate including: a top side, and a bottom side having an endless groove defined therein. The row unit also includes a drum configured to rotate relative to the cam-plate; a picker-bar pivotably coupled to the drum; and a linkage assembly including a first end coupled to the picker-bar and a second end having a roller configured to advance along the endless groove when the drum rotates relative to the cam-plate.

In some embodiments, the cam-plate includes a central aperture extending through the top side and the bottom side of the cam-plate, and the drum is configured to rotate about a drum axis of rotation extending through the central aperture. The cam-plate includes an outer aperture spaced apart from the central aperture and extending through the top side and the bottom side of the cam-plate, and the row unit further includes a doffer configured to rotate about a doffer axis extending through the outer aperture. The cam-plate includes a third aperture defined in the endless groove and extending through the top side and the bottom side of the cam-plate. When the cam-plate is coupled to the drum: the roller is accessible when the roller is aligned with the third aperture, and the roller is removable from the second end of the linkage assembly when the roller is aligned with the third aperture.

In some embodiments, the subassembly includes a first marker positioned on the cam-plate and a second marker positioned on the drum, and a lower portion of the drum is movable relative to the cam-plate between (i) a first position in which the first marker is offset from the second marker and (ii) a second position in which the first marker is aligned with the second marker.

In another illustrative embodiment, a method of assembling a row unit includes securing a plurality of picker-bars to a drum, each picker-bar of the plurality of picker-bars having a linkage assembly secured thereto; positioning rollers, each coupled to a corresponding linkage assembly, in an endless groove defined in a cam-plate; and positioning the drum in a frame of the row unit subsequent to securing the plurality of picker-bars to the drum and subsequent to positioning rollers in the endless groove of the cam-plate.

In some embodiments, the method of assembling a row unit further includes coupling the cam-plate to the frame subsequent to securing the plurality of picker-bars to the drum and subsequent to positioning rollers in the endless groove of the cam-plate; and aligning a first marker coupled to the cam-plate with a second marker coupled to the drum.

In some embodiments, the method of assembling a row unit further includes coupling a drum mount, that is fixed relative to the drum, to a floor subsequent to securing the plurality of picker-bars to the drum; and coupling the floor to the frame. In some embodiments, aligning a first marker coupled to the cam-plate with a second marker coupled to the drum includes moving the drum mount relative to the floor to align the first marker with the second marker.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
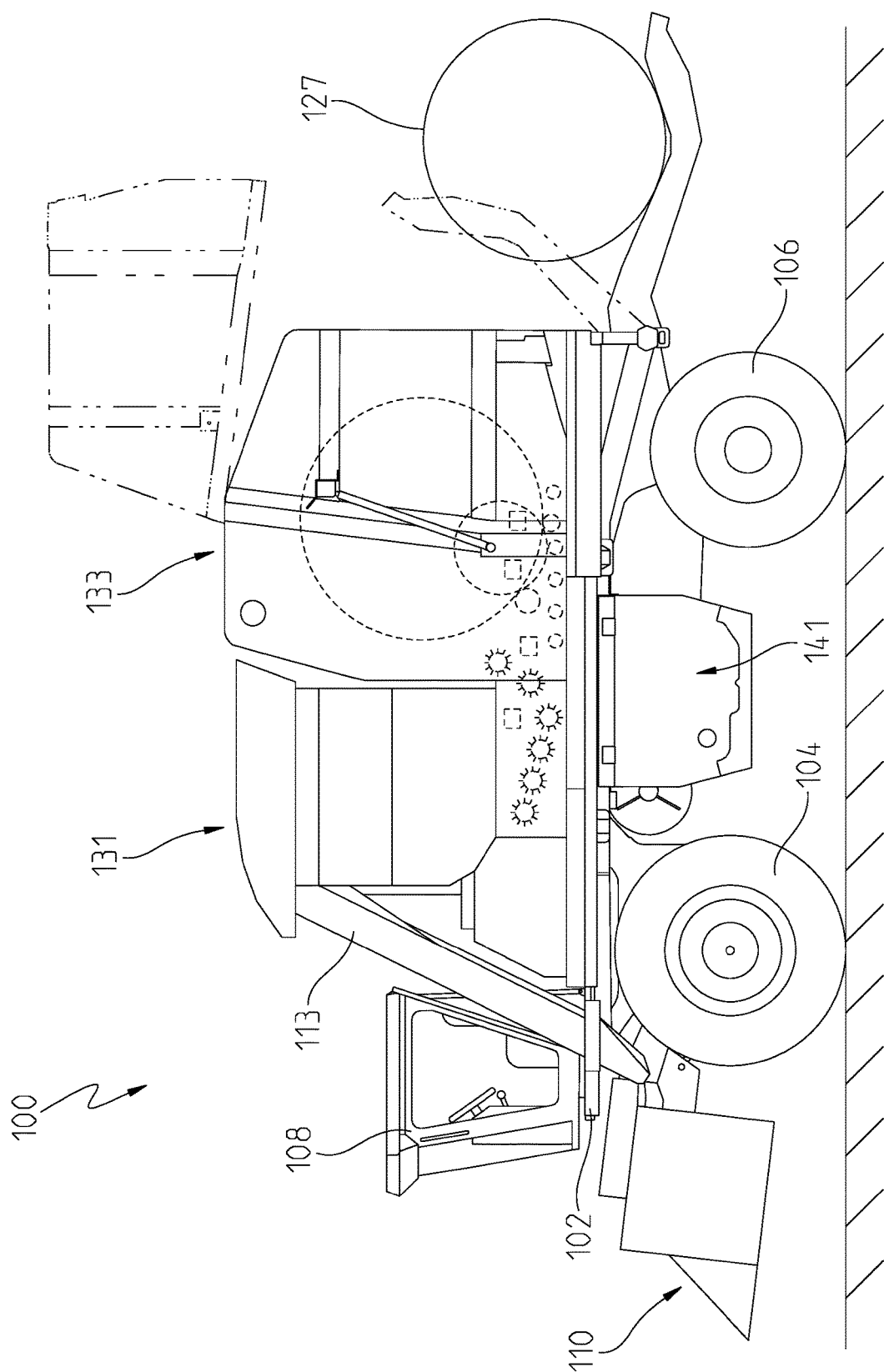
FIG. 1 is a side view of a cotton harvester.

Referring now to FIG. 1, one embodiment of a cotton harvester 100, which may also be referred to as a work machine 100, is shown having a main frame 102 supported for movement by front wheels 104 and rear wheels 106. An operator station or cab 108 is supported at the front end of the main frame 102 above forwardly mounted cotton harvesting units 110 which remove cotton from plants and direct the removed cotton into an air duct system 113. The forwardly mounted cotton harvesting units 110 may be referred to as row units 110.

An accumulator system 131 is shown coupled to the main frame 102 behind the cab 108 for receiving the cotton from the air duct system 113. The accumulator system 131 stores cotton as necessary, and a metering floor uniformly distributes the cotton to a module builder 133 which first forms a compressed mat of material and then rolls the mat into a compact bale or module 127.

While the cotton harvester 100 may have several motors and drive systems for powering components as described in more detail below, a prime mover 141 is the primary source of power to the components. More specifically, in one embodiment, the prime mover 141 may be a diesel or gas engine. The prime mover 141 may provide power to a ground drive, cotton fan, engine fan, hydraulic pump, and a cotton feeding system to name a few components. Further, the components may be powered through a hydraulic pump, electric generator, and/or mechanical drivetrain to name a few of the drive systems for the components driven by the prime mover 141.

While diesel and gas engines are described herein for the prime mover 141, other types of engines and drive systems are also considered. In one example, the prime mover may be a turbine engine. In another example, the prime mover may be an electric motor. In yet another example, the prime mover may by a hybrid combination of the diesel, gas, or turbine engine along with an electric generator and motor. Accordingly, many different types of prime movers 141 are considered herein, and no single type should be limiting.

This disclosure is not limited to the particular cotton harvester 100 shown in FIG. 1 and described above. Rather, this disclosure applies to any cotton harvester that utilizes drums to harvest cotton, and the cotton harvester 100 is only used as one example of such an application.

Figure 2:
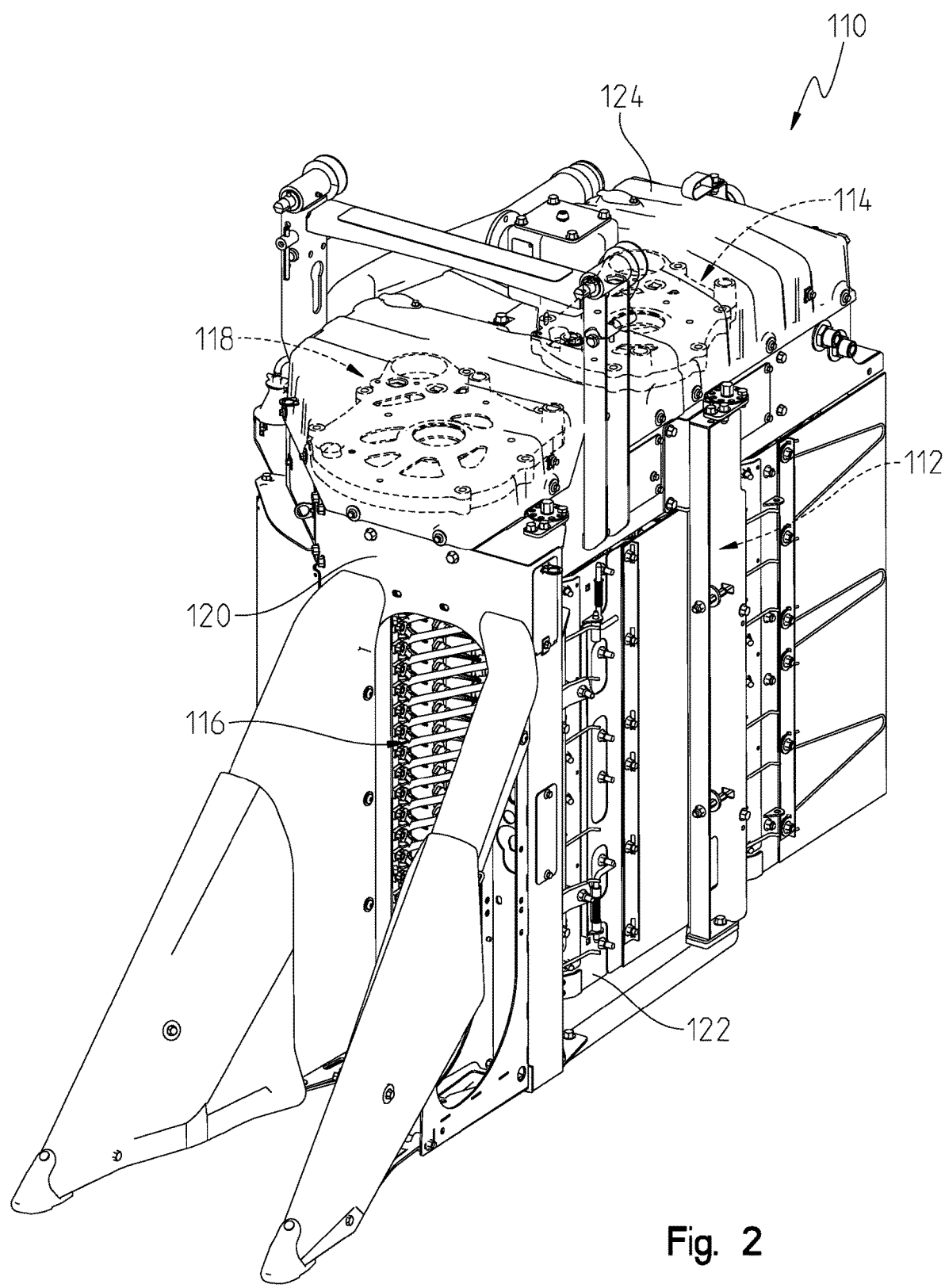
FIG. 2 is a perspective view of a cotton harvester row unit with a pair of subassemblies each including cam-plates shown in phantom.

Referring to FIG. 2, a row unit 110 is shown. In the illustrative embodiment, the row unit 110 includes a first drum 112 coupled to a first cam-plate 114 and a second drum 116 coupled to a second cam-plate 118. The row unit 110 further includes a frame 120 configured to surround and support the drums 112, 116 during operation of the work machine 100. The row unit 110 also includes a floor 122 configured to couple to the frame 120 and the drums 112, 116. Each of the drums 112, 116 are movable relative to the floor 122 when the drums 112, 116 are coupled to the frame 120, as will be described in greater detail below. Additionally, the row unit 110 includes a cover 124 coupleable to the frame 120 and configured to shield components positioned in the frame 120 from exterior crop or debris.

Figure 3:
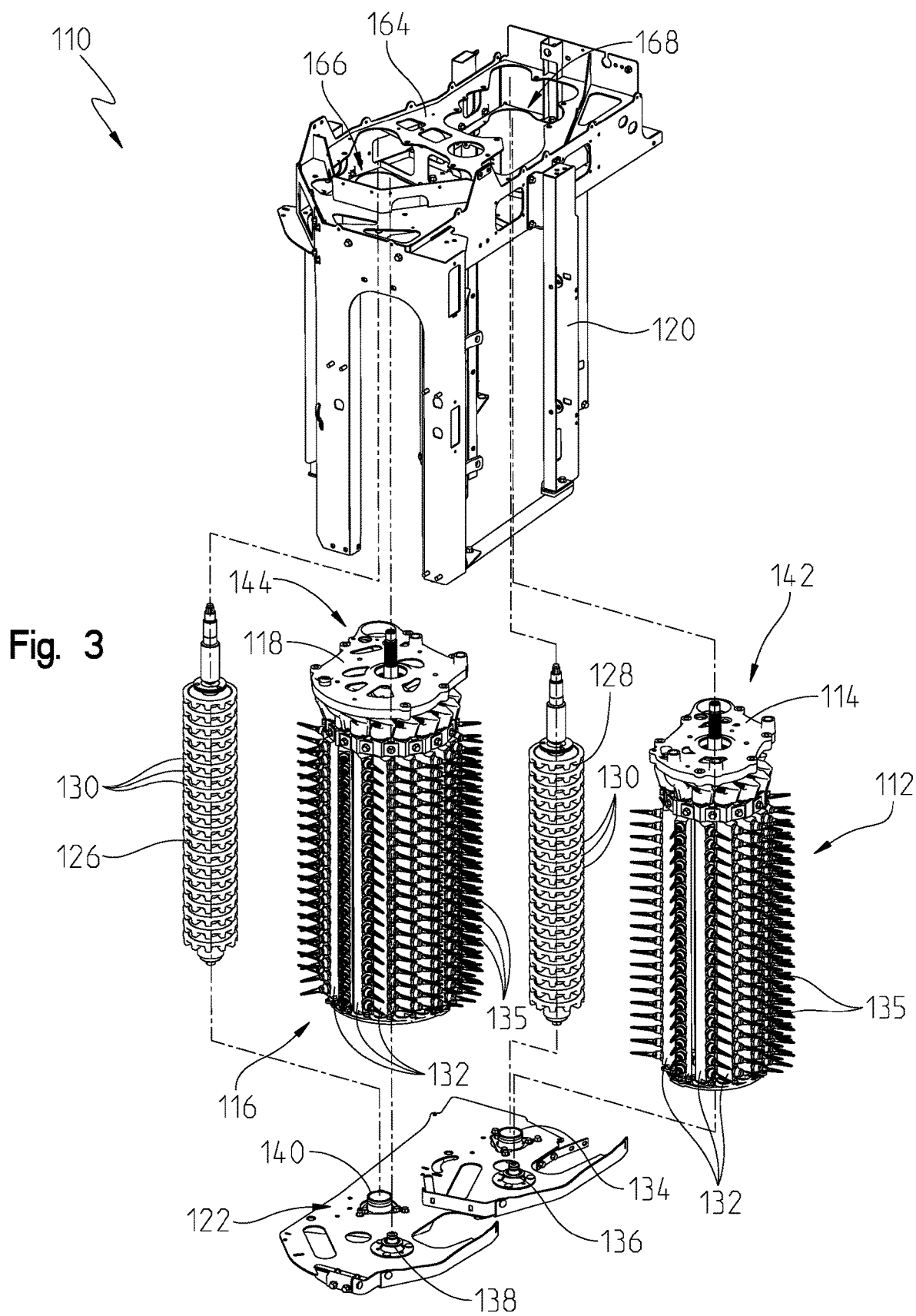
FIG. 3 is an exploded perspective view of the row unit of FIG. 2.

As shown in FIG. 3, the row unit further includes a first doffer 126 and a second doffer 128. Each doffer includes a plurality of vertically stacked doffer discs 130. The drums 112, 116 are each shown with a plurality of a picker bars 132 coupled thereto. In the illustrative embodiment, the first drum 112 has twelve picker bars 132 coupled thereto, and the second drum 116 has sixteen picker bars 132 coupled thereto. In other embodiments, each drum may have twelve picker bars 132 coupled thereto. In other embodiments still, each drum may have any number of picker bars 132 coupled thereto. It should also be appreciated that the row unit 110 may include more or less drums.

In any event, each picker bar 132 includes a plurality of spindles 135 coupled thereto via spindle nuts. Each spindle 135 can be tapered and have a barbed surface for removing cotton from a cotton plant. As shown in FIG. 3, each drum corresponds to a doffer positioned a predetermined distance away. The floor 122 includes a first drum mount 136 and a first doffer mount 134 positioned a predetermined distance from the first drum mount 136. Similarly, the floor 122 includes a second drum mount 138 and a second doffer mount 140 positioned a predetermined distance away from the second drum mount 138. In this configuration, the drums and the doffers each rotate such that the doffer discs 130 interact with the spindles 135 to remove picked cotton from the spindles 135.

As described above, each drum is coupled to a cam-plate, and a plurality of picker bars 132 are coupled to each drum. This group of components, among other components, forms a subassembly discrete from the frame 120 and the floor 122. As shown in FIG. 3, the row unit 110 includes a first subassembly 142 and a second subassembly 144. It should be appreciated that the first subassembly 142 and the second subassembly 144 interact in substantially the same way with their respective exterior-components, such as, for example, the frame 120, the floor 122, the drum mounts 136, 138, the doffers 126, 128, and the cover 124. Therefore, it should be appreciated that any reference to an interaction between the second subassembly 144 and an exterior-component applies with equal force to that of the first subassembly 142. Similarly, any description of the interaction between components included in the first subassembly 142 applies with equal force to that of the second subassembly 144, unless otherwise described herein or shown in the drawings.

As suggested by FIG. 3, the subassembly 144 may be assembled prior to positioning the drum 116 in the frame 120. In other words, each picker bar 132, that is all sixteen picker bars 132, are coupled to the drum 116, and subsequently, the drum 116 is positioned in and coupled to the frame 120. This order of assembly uniquely allows for ease of assembly. For example, the subassembly 144 can be assembled in an off-site location that is more ergonomically efficient for the user, and the drum 116 need not be rotated relative to the frame 120 to couple each subsequent picker bar 132 to the drum 116.

Figure 4:
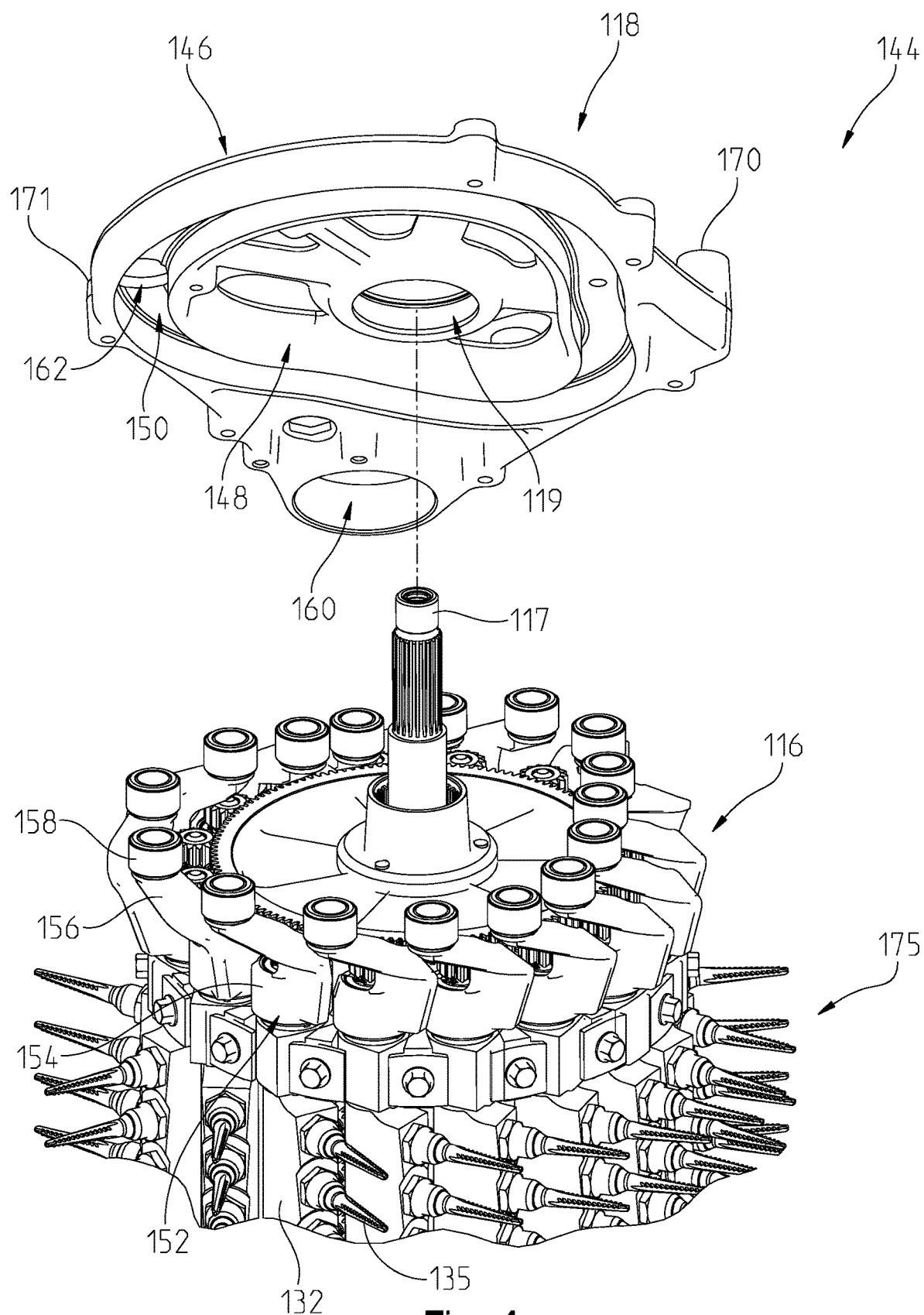
FIG. 4 is a modified perspective view of a portion of the row unit of FIG. 2 showing a cam-plate removed from a drum of the subassembly.

As suggested by FIG. 4, the cam-plate 118 facilitates the subassembly method mentioned above. The cam-plate 118 includes a top side 146, a bottom side 148, and a cam-track 150 defined in the bottom side 148. The cam-plate 118 defines a central aperture 119 extending through the top side 146 and the bottom side 148. The drum 116 includes an upper cylinder 117. When the cam-plate 118 is coupled to the drum 116, the upper cylinder 117 extends through the central aperture 119 of the cam-plate 118.

The cam-track 150 is sized and shaped to receive a plurality of linkage assemblies 152 used to pivot the picker bars 132 relative to the drum 116. It should be appreciated that the plurality of linkage assemblies 152 are included in the subassembly 144. Each linkage assembly 152 includes a first end 154 coupled to a picker bar 132 and a second end 156, at least of a portion of which is positionable in the cam-track 150. The first end 154 is fixedly coupled to a picker bar 132 such that each linkage assembly 152 is fixed relative to a corresponding picker bar 132. The second end 156 is coupled to a roller 158, and the roller 158 is sized and shaped to travel within the cam-track 150. The cam-track 150 is an endless, non-circular groove.

Figure 6:
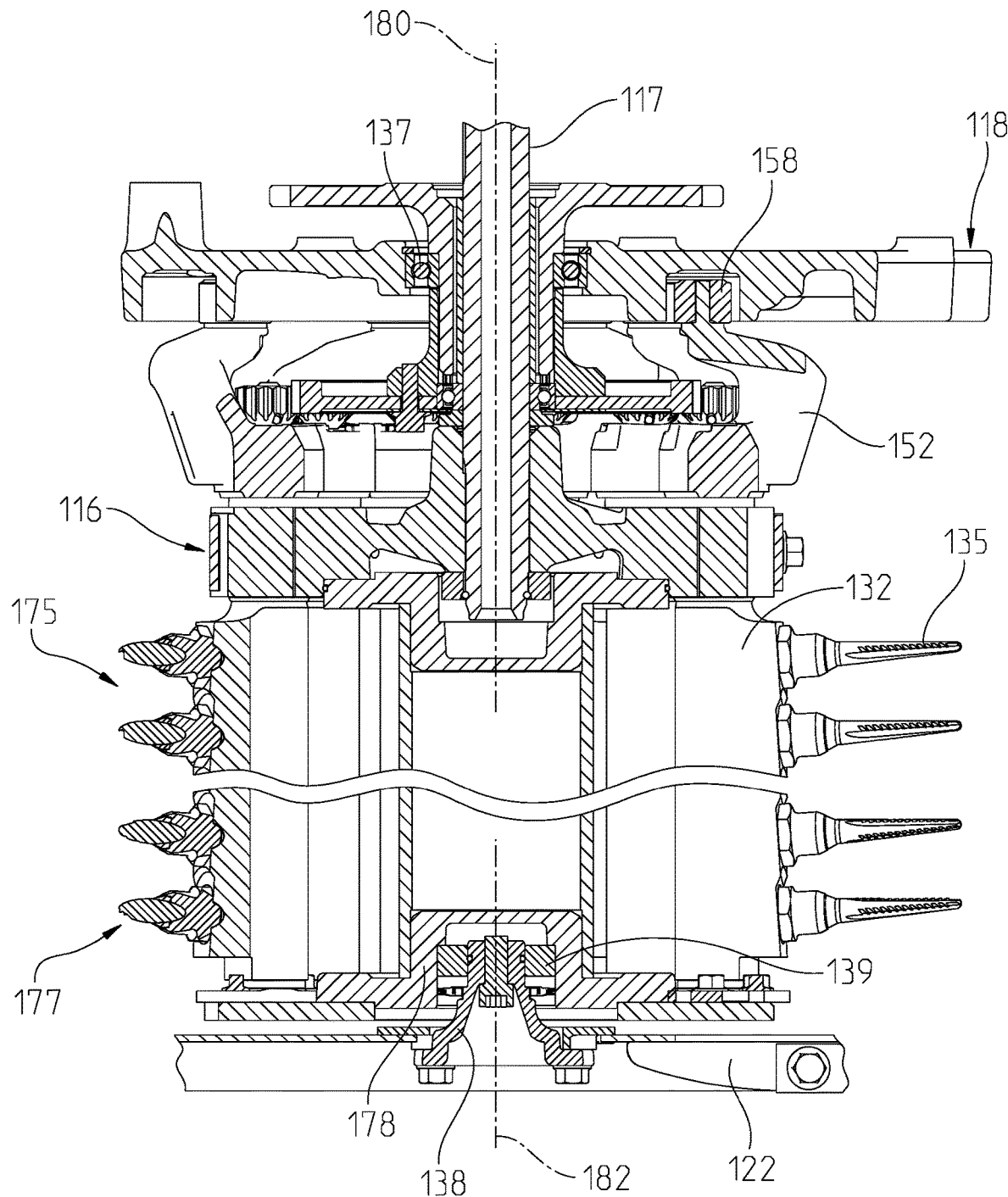
FIG. 6 is a modified section view of a subassembly showing upper and lower portions of the drum in alignment.

In some embodiments, the upper cylinder 117 may be a drive shaft 117, and the drive shaft 117 may be supported and surrounded by an upper bearing 137 (see FIG. 6). Rotation of the drive shaft is facilitated by the upper bearing 137 and ultimately causes the rollers 158 to travel along and within the cam-track 150. As the rollers 158 travel within the cam-track 150, the picker bars 132 and the spindles 135 coupled thereto move in a non-circular path, which is specifically designed to maximize the time each spindle 135 interacts with the cotton plant.

In conventional cotton picker designs, rollers may be coupled to picker bars and may travel in cam tracks to rotate the picker bars; however, in these conventional designs, the cam track is secured to the frame of the row unit prior to the picker bars being coupled to the drum. Likewise, the drum is secured to the frame prior to the picker bars being coupled to the drum. Additionally, the drum must be rotated within the frame to install each subsequent picker bar. Conversely, it should be appreciated by this disclosure that the picker bars 132, the linkage assembly 152, the drum 116, and the cam-plate 118 are coupled to one another to form the subassembly 144 prior to the cam-plate 118 or the drum 116 being coupled to the frame 120.

Referring still to FIG. 4, the cam-plate 118 defines an outer aperture 160 extending through the top side 146 and the bottom side 148 of the cam-plate 118. The outer aperture 160 is sized and shaped to receive the doffer 126. As shown in FIG. 4, the cam-plate 118 includes a third aperture 162 extending through the top side 146 and the bottom side 148 of the cam-plate 118. The third aperture 162 is positioned in the cam-track 150. As described above, each roller 158 is configured to travel along the cam-track 150. When a roller 158 is aligned with the third aperture 162 the roller 158 is accessible by a user via the third aperture 162. In this position, the aligned roller 158 is removable from the second end 156 of the linkage assembly 152. It should be appreciated that each roller 158 is removable from a linkage assembly 152 without removing the cam-plate 118 from the drum 116.

Referring now to FIGS. 3 and 4 in conjunction, the frame 120 includes a top sheet 164 that defines a front aperture 166 generally shaped to match the outer contour of the cam-plate 118 and a rear aperture 168 generally shaped to match the outer contour of the cam-plate 114. The top sheet 164 and the apertures 166, 168 are designed to facilitate use of the subassemblies 142, 144 in the frame 120. For example, the apertures 166, 168 may facilitate the coupling of drive gears or other components to the subassemblies 142, 144.

As suggested by FIG. 3, the second subassembly 144 is coupleable to the frame 120 such that the cam-plate 118 is aligned with the front aperture 166. Likewise, the first subassembly 142 is coupleable to the frame 120 such that the cam-plate 114 is aligned with the rear aperture 168. The cam-plate 118 includes a plurality of bosses, such as the boss 170 shown in FIG. 4. Fasteners (not shown) may be inserted through the top sheet 164 of the frame 120 and into the bosses to secure the cam-plate 118 (and the subassembly 144) to the frame 120. It should be appreciated that the cam-plate 118 is secured to the frame 120 subsequent to assembly of the subassembly 144.

Figure 5:
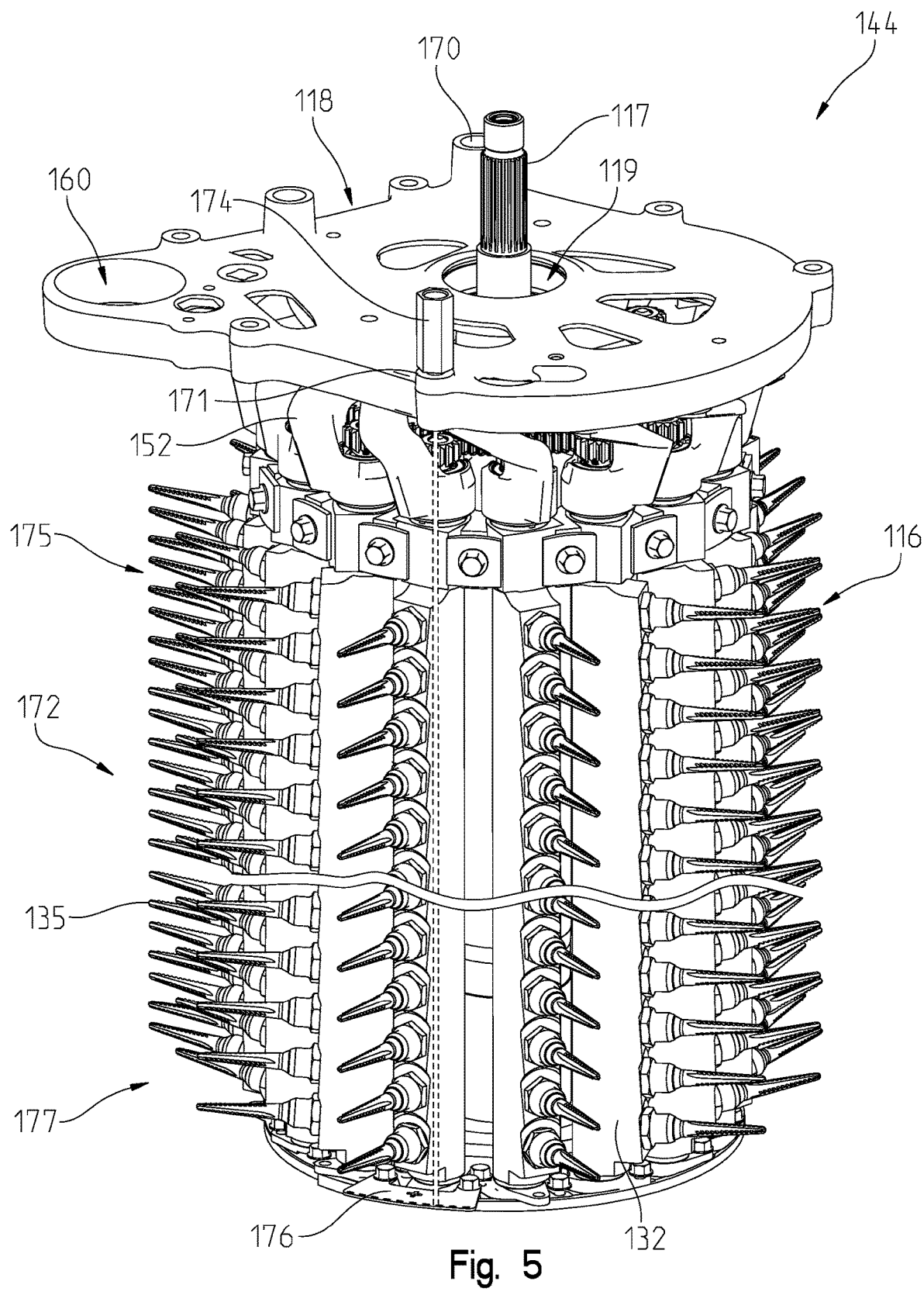
FIG. 5 is a modified perspective view of a subassembly having a laser alignment system used to align an upper portion of the drum with a lower portion of the drum.

As shown in FIG. 5, the subassembly 144 includes an alignment system 172. In the illustrative embodiment, the alignment system 172 includes a first marker 174 positioned on the cam-plate 118 and a second marker 176 positioned on the drum 116. In the illustrative embodiment, the first marker 174 is a laser 174 coupled to a boss 171 of the cam-plate 118, and the second marker 176 is an alignment plate 176 coupled to a lower portion 177 of the drum. The alignment plate 176 may include an indicia, such as a curved line. The drum 116 (and the alignment plate 176) may be rotated relative to the cam-plate 118 (and the laser 174) to determine whether the laser's beam passes through the indicia on the alignment plate 176. If the laser's beam does not passes through the indicia on the alignment plate 176 then the drum 116 is out of alignment. What is meant here by "out of alignment", is that an upper portion 175 of the drum is misaligned with a lower portion 177 of the drum. To introduce proper drum alignment, the lower portion 177 of the drum 116 is movable relative to the upper portion 175 of the drum 116. Specifically, while the upper portion 175 of the drum 116 is fixed relative to the cam-plate 118 and the frame 120, the lower portion 177 of the drum 116 is movable relative to those components. Thus, the lower portion 177 is movable relative to cam-plate 118, frame 120, and upper portion 175 between a first position in which the first marker 174 is offset from the second marker 176 and a second position in which the first marker 174 is aligned with the second marker 176.

As previously mentioned, and as shown in FIG. 6, the drum 116 includes an upper cylinder 117 or drive shaft 117. The drive shaft 117 is located in the upper portion 175 of the drum 116. The drum 116 also includes a second cylinder or cylindrical portion 178 located in the lower portion 177 of the drum 116. The upper cylinder 117 has a first longitudinal axis 180 about which the upper cylinder 117 is configured to rotate. Similarly, the lower cylinder 178 has a second longitudinal axis 182 about which the lower cylinder 178 is configured to rotate. When the first marker 174 is aligned with the second marker 176, the first longitudinal axis 180 is aligned with the second longitudinal axis 182. Such alignment is shown by FIG. 6.

As shown in FIG. 6, there are a multitude of components used to indirectly couple the upper cylinder 117 or upper portion 175 of the drum 116 to the lower cylinder 178 or lower portion 177 of the drum 116. As such, misalignment may exist between the upper portion 175 and the lower portion 177 of the drum 116, as described above. To correct this misalignment, the row unit 110 includes the drum mount 138. The drum mount 138 may be fixed relative to the drum 116 and moveable relative to the floor 122. Movement of the drum mount 138 relative to the floor 122 adjusts the position of the lower portion 177 of the drum 116 relative to the upper portion 175 of the drum 116. The drum mount 138 may include a plurality of apertures configured to receive a plurality of fasteners that may be tightened to secure the drum mount 138 to the floor 122. The fasteners may be loosened such that the drum mount 138 is moveable relative to the floor. The fasteners may be tightened once again to secure to the lower portion 177 of the drum 116 in its new position relative to the floor 122.

Referring still to FIG. 6, the drum mount 138 is surrounded by and supports a lower bearing 139. The lower bearing 139 is used to support and facilitate rotation of the drum 116 relative to the drum mount 138. Specifically, the lower bearing 139 facilitates rotation of the lower portion 177 (and the cylindrical portion 178) of the drum 116. Together, the upper bearing 137 and the lower bearing 139 allow the upper and lower portions 175, 177 of the drum 116 to rotate relative to the frame 120, the floor 122, and the cam-plate 118.

In use, a user may couple the picker bars 132 to the drum 116. The user may also position the rollers 158 in the cam-track 150 of the cam plate 118. As described, the rollers 158 are coupled to picker bars 132 via the linkage assemblies 152. As such, the drum 116, the picker bars 132, the linkage assemblies 152, the rollers 158, and the cam-plate 118 form the subassembly 144. It should be appreciated that, in some embodiments, the alignment system 172 may also be included in the subassembly 144. The subassembly 144 is discrete from the frame 120 and the floor 122. Subsequently, the drum 116 may be attached to the floor 122. Specifically, the lower portion 177 of the drum 116 may be coupled to the drum mount 138, which is coupled to the floor 122. Subsequently, the doffer 126 may be coupled to the cam-plate 118 and the floor 122. Specifically, an upper portion of the doffer 126 may be positioned in the outer aperture 160 of the cam-plate 118, and a lower portion of the doffer 126 may be coupled to the doffer mount 140 to facilitate rotation of the doffer 126 relative to the cam-plate 118. In some embodiments, the doffer mount 140 may be moved relative to the floor 122 to adjust the orientation or alignment of the doffer 126.

With the drum 116 attached to the floor 122, the user may slide the frame 120 over the drum 116 to partially surround the drum 116 with frame 120. Subsequently, the frame 120 may be secured to the floor 122, and the cam-plate 118 may be secured to the frame 120 as described above. Subsequently, a determination may be made as to whether the drum 116 is out of alignment. For example, as described above, the drum 116 may be rotated relative to the cam-plate 118 to determine whether the laser beam passes through the alignment indicia located on the alignment plate 176. If the laser beam does not pass through the indicia, the drum 116 is out of alignment. If the drum 116 is out of alignment, the drum mount 138 may be moved relative to the floor 122 to adjust the position of the lower portion 177 of the drum 116 relative to the upper portion 175 of the drum 116. When the laser passes through the alignment indicia, proper alignment of the drum 116 has been achieved, and the first longitudinal axis 180 is aligned with the second longitudinal axis 182. Subsequently, the cover 124 and additional side panels may be coupled to the frame 120 to shield the now-internal components from dirt and debris.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A row unit for an agricultural machine, the row unit comprising:
   a frame; and
   a subassembly configured to be positioned within and coupled to the frame during operation of the row unit, the subassembly including:
      a cam-plate including a top side, a bottom side, and an endless groove defined in the bottom side,
      a drum;
      a picker-bar coupled to the drum,
      a linkage assembly including a first end coupled to the picker-bar and a second end positioned in the endless groove, and
      an alignment system including a first marker positioned on the cam-plate and a second marker positioned on the drum;
   wherein the second marker is configured to align with the first marker as the drum is rotated relative to the cam-plate.

2. The row unit of claim 1, wherein:
   the cam-plate includes an outer aperture extending through the top side and the bottom side of the cam-plate, and
   the row unit further comprises a doffer that is positionable so as to extend through the outer aperture of the cam-plate.

3. The row unit of claim 2, wherein:
   the cam-plate includes a central aperture spaced apart from the outer aperture and extending through the top side and the bottom side of the cam-plate, and
   the drum is positionable so as to extend through the central aperture.

4. The row unit of claim 1, further comprising:
a floor removably coupled to the frame; and
a drum mount couplable to the drum and coupled to the floor,
wherein when the drum mount is fixed relative to the drum, the drum mount is movable relative to the floor between (i) a first position in which the first marker is offset from the second marker and (ii) a second position in which the first marker is aligned with the second marker.

5. The row unit of claim 4, wherein:
the first marker is a laser; and
when the drum mount is engaged with the drum and in the second position, the second marker is configured to pass through a beam of the laser as the drum is rotated relative to the cam-plate.

6. The row unit of claim 1, wherein:
the drum includes:
   an upper cylinder extending through a central aperture of the cam-plate, the upper cylinder having a first longitudinal axis, and
   a lower cylinder coupled to the upper cylinder and having a second longitudinal axis; and
the first longitudinal axis is aligned with the second longitudinal axis when the first marker is aligned with the second marker.

7. The row unit of claim 1, further comprising:
a central aperture extending through the top side and the bottom side of the cam-plate; and
an upper bearing positioned in the central aperture.

8. The row unit of claim 7, wherein:
the drum includes an upper cylinder, and
the upper bearing surrounds the upper cylinder and is positioned between the upper cylinder of the drum and the cam-plate during operation of the row unit to facilitate rotation of the upper cylinder relative to the cam-plate.

9. The row unit of claim 8, further comprising:
a lower cylinder coupled to the upper cylinder;
a floor removably coupled to the frame;
a drum mount removably coupled to the floor; and
a lower bearing positioned between the drum mount and the lower cylinder of the drum during operation of the row unit to facilitate rotation of the lower cylinder relative to the cam-plate.

10. A row unit for an agricultural machine comprising a subassembly including:
a cam-plate including:
   a top side, and
   a bottom side having an endless groove defined therein,
a drum configured to rotate relative to the cam-plate;
a picker-bar pivotably coupled to the drum; and
a linkage assembly including a first end coupled to the picker-bar and a second end having a roller configured to advance along the endless groove when the drum rotates relative to the cam-plate;
wherein the cam-plate includes an outer aperture extending through the top side and the bottom side of the cam-plate, and
wherein the row unit further includes a doffer configured to rotate about a doffer axis extending through the outer aperture.

11. The row unit of claim 10, wherein:
the cam-plate includes a central aperture extending through the top side and the bottom side of the cam-plate, and
the drum is configured to rotate about a drum axis of rotation extending through the central aperture.

12. The row unit of claim 11, wherein the cam-plate includes a third aperture defined in the endless groove and extending through the top side and the bottom side of the cam-plate.

13. The row unit of claim 12, wherein when the cam-plate is coupled to the drum:
the roller is accessible when the roller is aligned with the third aperture, and
the roller is removable from the second end of the linkage assembly when the roller is aligned with the third aperture.

14. The row unit of claim 10, wherein:
the subassembly includes a first marker positioned on the cam-plate and a second marker positioned on the drum, and
a lower portion of the drum is movable relative to the cam-plate between (i) a first position in which the first marker is offset from the second marker and (ii) a second position in which the first marker is aligned with the second marker.

15. A method of assembling a row unit comprises:
securing a plurality of picker-bars to a drum, each picker-bar of the plurality of picker-bars having a linkage assembly secured thereto;
positioning rollers, each coupled to a corresponding linkage assembly, in an endless groove defined in a cam-plate; and
positioning the drum in a frame of the row unit subsequent to securing the plurality of picker-bars to the drum and subsequent to positioning rollers in the endless groove of the cam-plate.

16. The method of claim 15, further comprising:
coupling the cam-plate to the frame subsequent to securing the plurality of picker-bars to the drum and subsequent to positioning rollers in the endless groove of the cam-plate; and
aligning a first marker coupled to the cam-plate with a second marker coupled to the drum.

17. The method of claim 15, further comprising:
coupling a drum mount, that is fixed relative to the drum, to a floor subsequent to securing the plurality of picker-bars to the drum; and
coupling the floor to the frame.

18. The method of claim 17, wherein aligning a first marker coupled to the cam-plate with a second marker coupled to the drum includes:
moving the drum mount relative to the floor to align the first marker with the second marker.

19. A subassembly for a row unit of an agricultural machine comprising:
a cam-plate including:
   a top side, and
   a bottom side having an endless groove defined therein,
a drum configured to rotate relative to the cam-plate;
a picker-bar pivotably coupled to the drum; and
a linkage assembly including a first end coupled to the picker-bar and a second end having a roller configured to advance along the endless groove when the drum rotates relative to the cam-plate;
wherein:
   the subassembly includes a first marker positioned on the cam-plate and a second marker positioned on the drum, and
   a lower portion of the drum is movable relative to the cam-plate between (i) a first position in which the first marker is offset from the second marker and (ii) a second position in which the first marker is aligned with the second marker.

\* \* \* \* \*